(12) United States Patent
Pettigrew et al.

(10) Patent No.: US 7,003,178 B2
(45) Date of Patent: Feb. 21, 2006

(54) COLOR MATCHING IMAGE DATA

(75) Inventors: Daniel Pettigrew, Montreal (CA); François Paquin, Montreal (CA)

(73) Assignee: Autodesk Canada Co., Montreal (CA)

( * ) Notice: Subject to any disclaimer, the term of this patent is extended or adjusted under 35 U.S.C. 154(b) by 0 days.

(21) Appl. No.: 10/956,981

(22) Filed: Oct. 1, 2004

(65) Prior Publication Data
US 2005/0041854 A1 Feb. 24, 2005

Related U.S. Application Data

(62) Division of application No. 10/799,213, filed on Mar. 12, 2004, which is a division of application No. 09/769,977, filed on Jan. 25, 2001, now Pat. No. 6,754,399.

(30) Foreign Application Priority Data

Apr. 7, 2000 (GB) .................................. 0008474

(51) Int. Cl.
*G06K 9/32* (2006.01)
*G06K 9/00* (2006.01)
(52) U.S. Cl. ........................... 382/300; 382/167
(58) Field of Classification Search ................ 382/162, 382/165, 167, 276, 282, 300; 358/518, 523, 358/524, 525, 527, 530; 345/103, 552, 600, 345/606; 355/38; 396/324
See application file for complete search history.

(56) References Cited

U.S. PATENT DOCUMENTS

| 5,559,604 | A |   | 9/1996 | Arai ........................... 356/402 |
| 5,579,031 | A |   | 11/1996 | Liang ......................... 345/604 |
| 5,619,596 | A |   | 4/1997 | Iwaki et al. ................. 382/278 |
| 5,668,569 | A | * | 9/1997 | Greene et al. .............. 345/103 |
| 5,724,450 | A |   | 3/1998 | Chen et al. ................. 382/235 |
| 5,727,093 | A |   | 3/1998 | Uchiyama et al. .......... 382/294 |
| 5,883,698 | A | * | 3/1999 | Kimura ....................... 355/38 |
| 6,034,697 | A | * | 3/2000 | Becker ....................... 345/606 |

(Continued)

FOREIGN PATENT DOCUMENTS

GB    2 157 529 A    10/1985

(Continued)

*Primary Examiner*—Andrew W. Johns
*Assistant Examiner*—Amir Alavi
(74) *Attorney, Agent, or Firm*—Gates & Cooper LLP

(57) ABSTRACT

A method of matching image color and or luminance characteristics in an image processing system. In order to match an input image with a reference image, a color transformation M is initialised (601). An output image is copied (602) from the input image. The following sequence of operations is then repeated: Output and reference images are displayed on a system monitor. The user identifies (603) a highlight, shadow or overall region in both images. These regions are processed (604) to identify a difference (605). The difference is concatenated (606) onto transformation M. The output image is updated (607) by processing the input with M.

6 Claims, 18 Drawing Sheets

U.S. PATENT DOCUMENTS

| | | | |
|---|---|---|---|
| 6,046,723 A | 4/2000 | Daniels et al. | 345/600 |
| 6,075,905 A | 6/2000 | Herman et al. | 382/284 |
| 6,091,862 A * | 7/2000 | Okisu | 382/300 |
| 6,104,413 A * | 8/2000 | Cheng et al. | 345/552 |
| 6,111,984 A | 8/2000 | Fukasawa | 382/209 |
| 6,188,800 B1 | 2/2001 | Okitsu | 382/276 |
| 6,504,957 B1 | 1/2003 | Nguyen et al. | 382/209 |
| 6,522,338 B1 * | 2/2003 | Takagi | 345/600 |
| 6,559,982 B1 | 5/2003 | Gondek | 358/518 |
| 6,563,945 B1 | 5/2003 | Holm | 382/162 |
| 6,625,216 B1 | 9/2003 | Zhu | 375/240.16 |
| 6,628,823 B1 | 9/2003 | Holm | 382/162 |
| 6,697,573 B1 * | 2/2004 | Adkins | 396/324 |
| 6,766,055 B1 | 7/2004 | Matsugu et al. | 382/173 |

FOREIGN PATENT DOCUMENTS

WO     WO 98/10586     3/1998

\* cited by examiner

Y′ = 0.299N R + 0.587 G + 0.114 B
Pb = − 0.169 R − 0.331 G + 0.5 B
Pr = 0.5 R − 0.419 G − 0.081 B

1102

MATRIX 'A' TRANSFORMS RGB TO Y′Pb Pr

MATRIX 'A$^{-1}$' TRANSFORMS Y′Pb Pr TO RGB

RGB BLACK = ( 0, 0, 0 );   Y′Pb Pr BLACK = ( 0, 0, 0 )
RGB WHITE = ( 1, 1, 1 );   Y′Pb Pr WHITE = ( 1, 0, 0 )

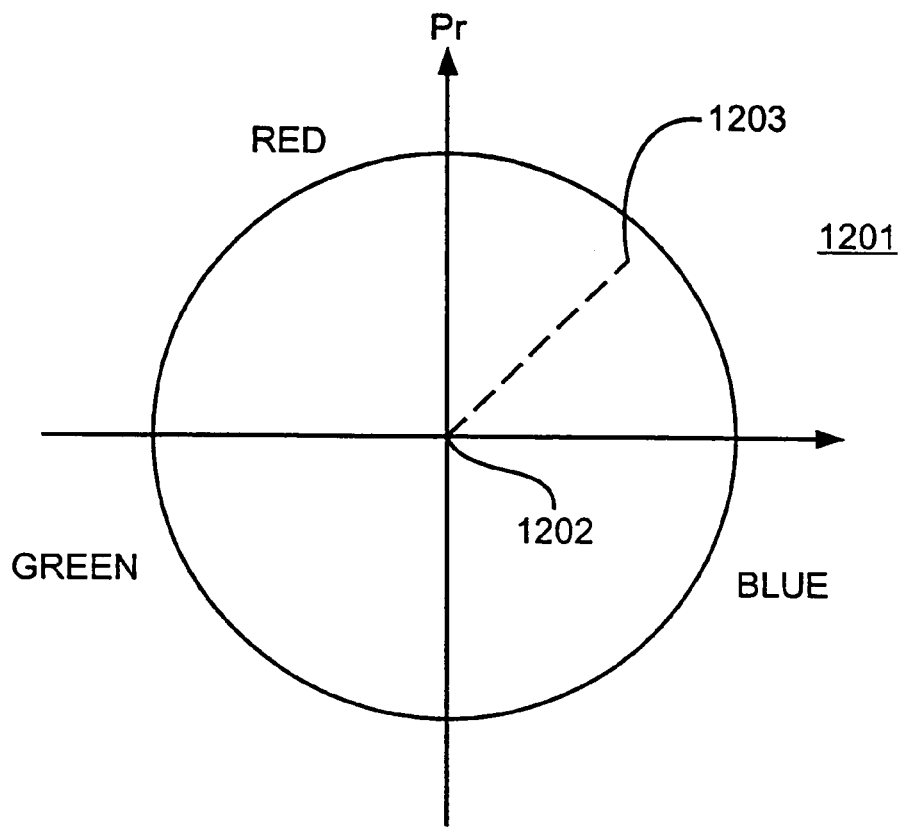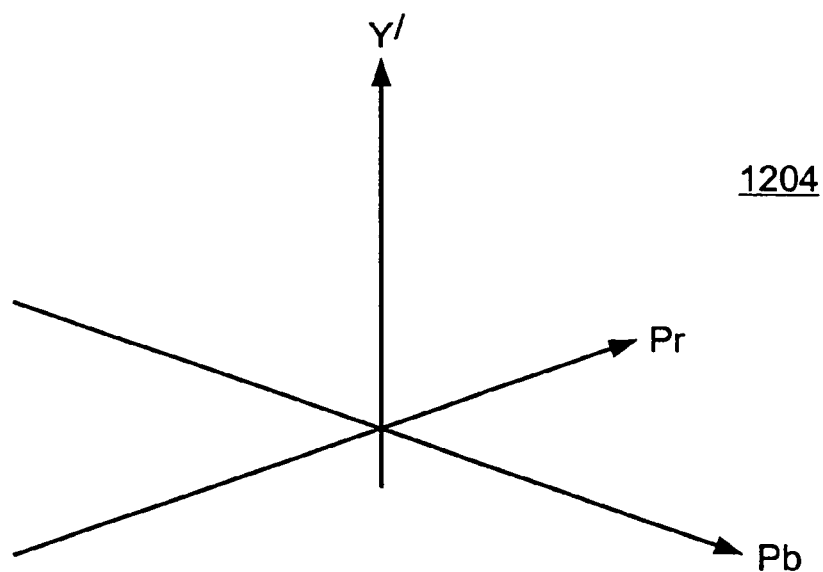
Fig.12

COLOR MATCHING IMAGE DATA

CROSS-REFERENCE TO RELATED APPLICATIONS

This application is a divisional application of Ser. No. 10/799,213, filed Mar. 12, 2004 for COLOR MATCHING IMAGE DATA by Daniel Pettigrew et al., which is a divisional application of Ser. No. 09/769,977, filed Jan. 25, 2001, now U.S. Pat. No. 6,754,399, issued Jun. 22, 2004.

BACKGROUND OF THE INVENTION

1. Field of the Invention

The present invention relates to apparatus for processing image data, the method of processing image data and a computer-readable medium.

2. Description of the Related Art

Film editing and processing has historically been performed without the aid of digital image processing systems. In the past, the appearance of different film batches was controlled by a film colorist, whose job it is to ensure that when different film clips are spliced and edited together, their characteristics are not noticeably different. In order to achieve this, exposure times, negative types, and lighting conditions during a shoot have to be carefully controlled, and this is a highly specialised aspect of cinematography.

At the present time, increasing amounts of film editing and processing are being performed within a digital environment. The transfer of film processing to the digital domain has been relatively slow due to the enormous amounts of data that are required to be stored. Up to forty megabytes of data per frame of film is required in order to achieve equivalent film resolution in a digitised image. Slowly, however, as the cost of computer hardware and storage reduces, film processing is moving into the digital domain.

Once images have been digitised, it is possible to mix image data from a variety of formats, for example video mixed with film images, and to composite and edit these images together. It is known to imitate the film look by applying certain non-linear processing to video-sourced images, and so it may be possible to mix video and film images without the changeover being obvious between the two.

However, even though images can be freely mixed, composited and arranged in the digital domain, high quality editing still requires the same attention to detail that was performed by the film colorist. It is still necessary to control color matching between different image sources, whether they be from different reels of film, or from unrelated sources such as video. While it is widely known to employ controls such as contrast, color look-up tables, and various types of color manipulation, none of these methods provides an easy way of achieving a color match between images. A skilled colorist may be able to manipulate known systems in order to achieve a high degree of color matching. However, this remains a skilled and time consuming job. It is also a task that needs to be performed many times within a typical editing session.

BRIEF SUMMARY OF THE INVENTION

According to an aspect of the present invention, there is provided apparatus for processing image data, including memory means for storing image data and processing instructions, and processing means for performing said image processing, wherein said instructions define operations to be performed by said processing means in order to process said image data, and said processing means is configured by said instructions such that: an input image is to be matched with a reference image, an initial output image has been generated from said input image and a matching transformation for processing image data has been initialised; and said operations include repeated steps of identifying a first region in said output image and a reference image in said reference image, wherein said regions have a similar characteristic; comparing said regions to identify a difference transformation for said output image; updating said matching transformation by applying said difference transformation to it; and processing said input image with said matching transformation to update said output image.

BRIEF DESCRIPTION OF THE SEVERAL VIEWS OF THE DRAWINGS

FIGS. 11 and 12 illustrate color spaces and color space relationships used by the present invention;

BEST MODE FOR CARRYING OUT THE INVENTION

Figure 1:
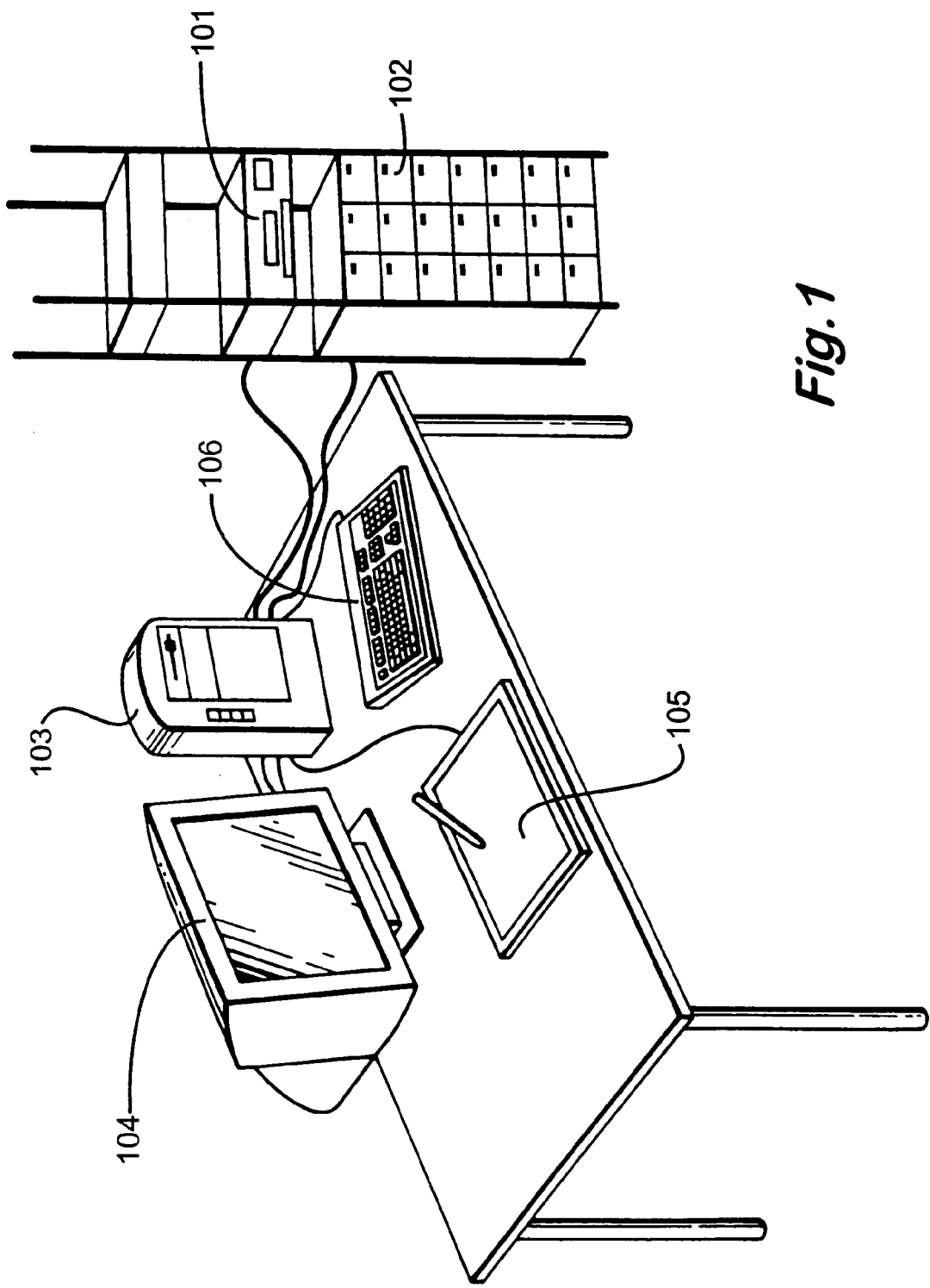
FIG. 1 shows an image processing system, including a monitor and a computer.

A system for the processing of image data is illustrated in FIG. 1. A digital tape player 101 plays and records digital tapes having a high data capacity suitable for storing many frames of high definition image data. In preparation for image processing, images for a film clip are transferred from a tape in the tape player 101 to a frame store 102. The frame store 102 comprises several high capacity hard disk drives, arranged to supply and store image data in parallel across many individual drives at once. The hard disk drives are configured as a redundant array of inexpensive disks (RAID). Using the frame store 102, it is possible to play back and record high resolution film images at any location in a clip without having to wait for a tape wind mechanism to reach the required frame. Furthermore the frame store facilitates real time play and record of image data, when the amount of processing being performed is minimal, for example when previewing a stored clip.

A computer 103 facilitates the transfer of image data between the tape player 101 and the frame store 102. The computer 103 also facilitates the modification, processing and adjustment of image data to form an output clip that will eventually be stored onto digital tape. The computer is a Silicon Graphics Octane (TM). Images are previewed on a monitor 104 on which is also displayed a graphical user interface (GUI) to provide the user with several controls and interfaces for controlling the manipulation of image data. When processing image data, the user interacts with images and the graphical user interface displayed on the monitor 104 via a graphics tablet 105. For alphanumeric input, there is provided a keyboard 106, although facilities may be provided via the graphical user interface to facilitate occasional text input using the graphics tablet 105.

In addition to receiving image data from the tape player 101 and the frame store 102, the computer 103 may receive image and or other data over a network. The image processing system shown in FIG. 1 facilitates the manipulation of image data by a digital artist in order to achieve high quality special effects and processing of image data.

In a typical application, film clips are digitised and stored on digital tape for transfer to the system in FIG. 1. The film clips include several camera shots that are to be combined into the same scene. It is the task of the user or digital artist to combine and process this source image data into a single output clip that will be stored back onto tape for later transfer to film. Typical examples of this type of scene are where real images shot by a film camera are to be combined with artificially generated images and backgrounds, including scenes where actors are to be placed in computer-generated environments.

Figure 2:
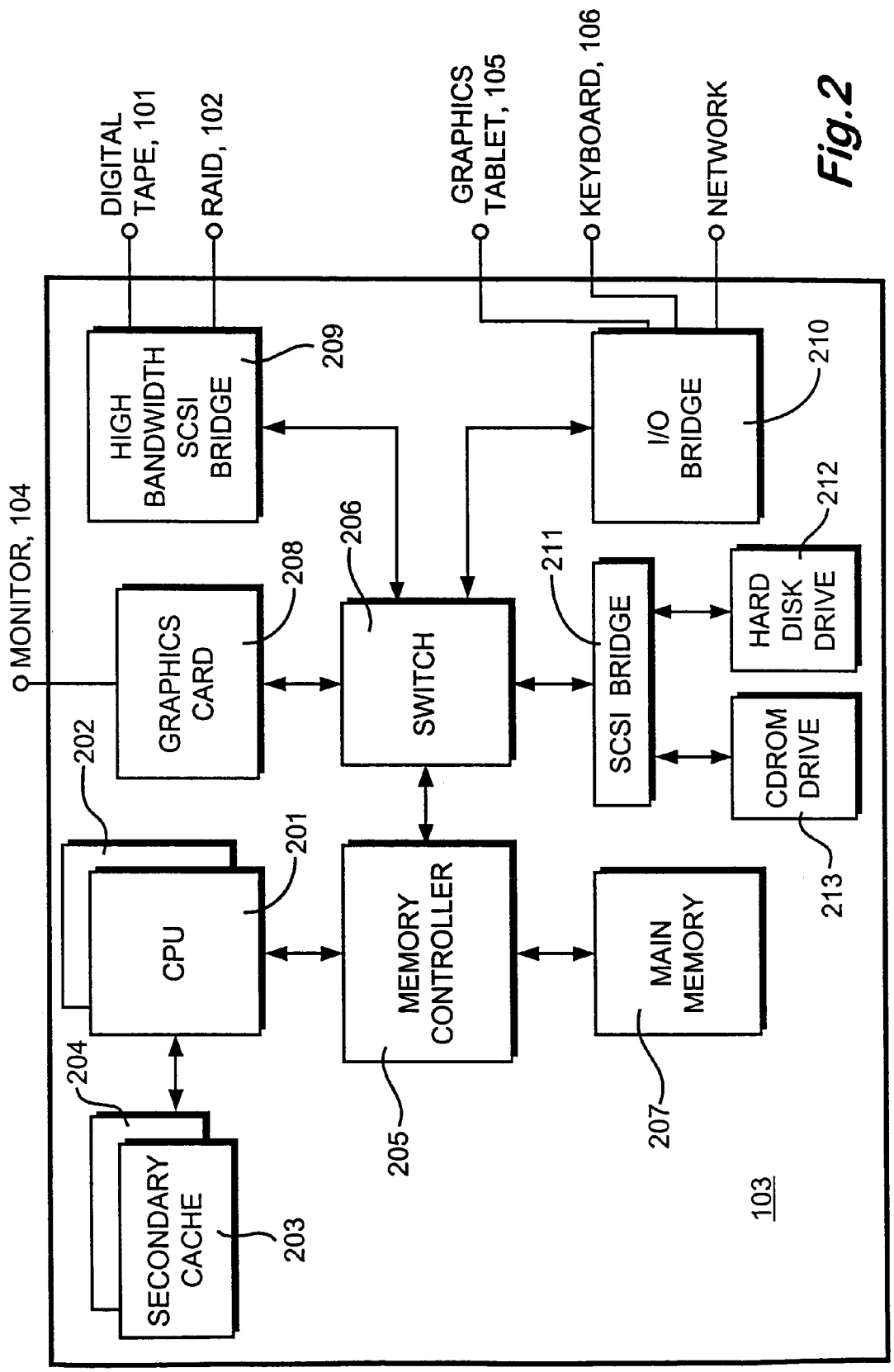
FIG. 2 details components of the computer shown in FIG. 1, including a main memory.

The computer 103 shown in FIG. 1 is detailed in FIG. 2. Two MIPS R12000 central processing units (CPUs) 201 and 202 are configured to process instructions and data in parallel. Primary cache facilities are provided within each of the processors 201 and 202 in the form of a separate instruction and data cache. Both processors 201 and 202 are equipped with a one megabyte secondary cache 203 and 204. The CPUs 201 and 202 are connected via a memory controller to a switch 206 and a main memory 207. The main memory 207 comprises two gigabytes of dynamic RAM.

The switch 206 enables up to seven different non-blocking connections to be made between connected circuits. A graphics card 208 receives instructions from a CPU 201 or 202 in order to render image data and graphical user interface components on the monitor 104. A high bandwidth SCSI bridge 209 facilitates high bandwidth communications to be made with the digital tape player 101 and the frame store 102. An I/O bridge 210 provides input output interface circuitry for peripherals, including the graphics tablet 105, the keyboard 106 and a network. A second SCSI bridge 211 provides interface connections with an internal hard disk drive 212. This has a capacity of thirteen gigabytes. The second SCSI bridge 211 also provides connections to a CDROM drive 213, from which instructions for the central processing units 201 and 202 may be installed onto the hard disk 212.

Instructions for central processing units 201 and 202 determine how image data is processed. Several applications have been developed for image processing using processing hardware of the type shown in FIG. 2. The present applicant has image processing applications that include Flame (TM). The name Flame will henceforward refer to an improved version of Flame, operating in accordance with the present invention.

Figure 3:
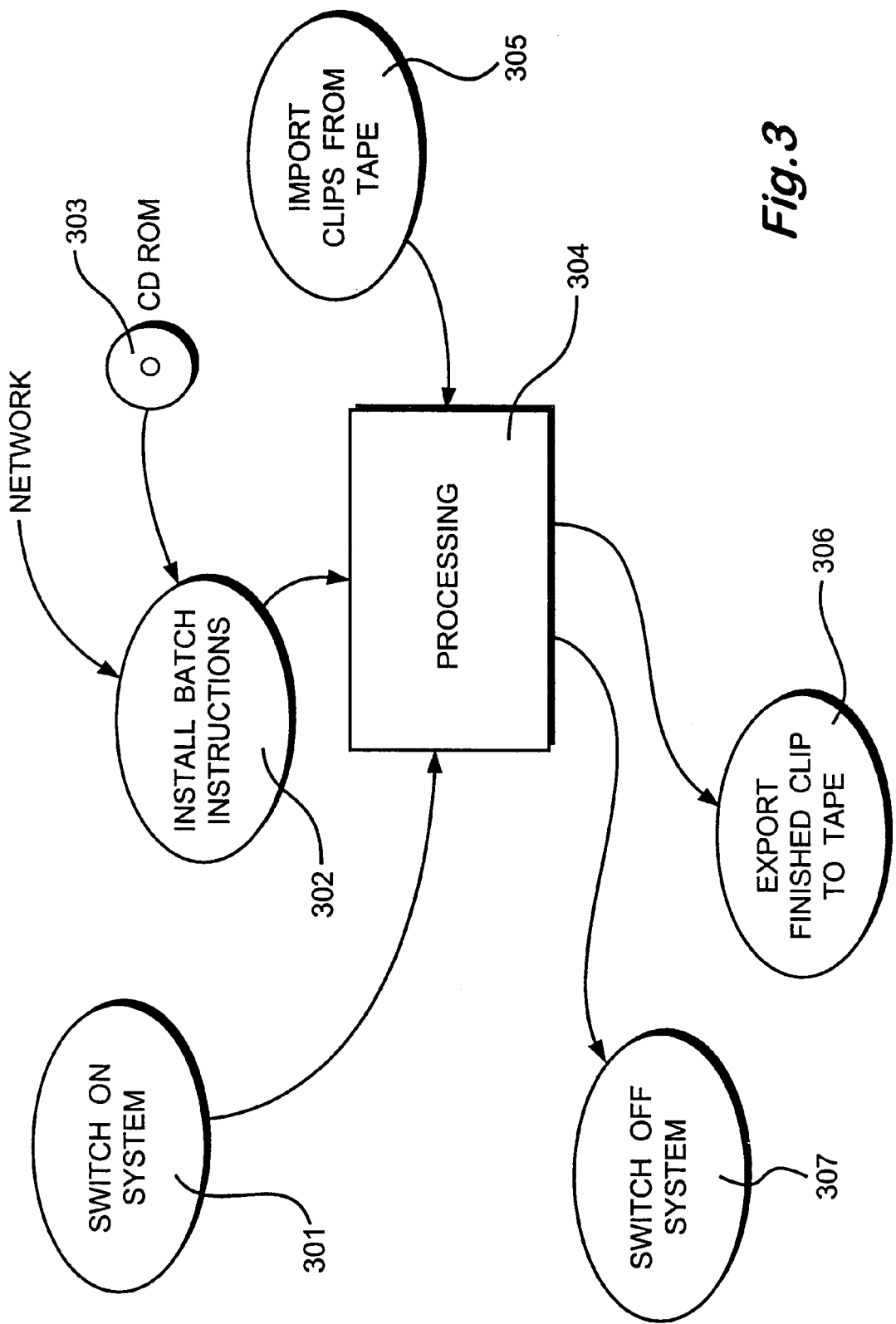
FIG. 3 details steps performed by an operator of the image processing system shown in FIG. 1, including an image processing step.

Steps performed by the user when operating the image processing system shown in FIG. 1 are detailed in FIG. 3. At step 301 the user switches on the computer 103 and logs on to their user account. If necessary, the user proceeds to step 302 in order to install Flame instructions onto the computer's hard disk 212. Instructions may be provided on a CDROM 303 via the CDROM drive 213, or over a network. Thereafter, control is directed to step 304, whereafter the instructions are executed by the CPUs 201 and 202. If starting on a new job, it will be necessary to obtain image data from film or video clips stored on digital tapes. This is done at step 305, where input clips are transferred from the tape player 101 to the digital frame store 102. Once a finished clip has been generated from the input clips, this is exported to tape at step 306. Alternative forms of import and export of image data may be performed as necessary, including transfer of image data over a network, transfer of image data from CDROM or transfer of data directly from a camera that may be connected to the input of a suitably equipped graphics card 208. Once finished using the image processing system, at step 307 the user logs off from their account and the computer and other equipment are switched off if necessary.

Figure 4:
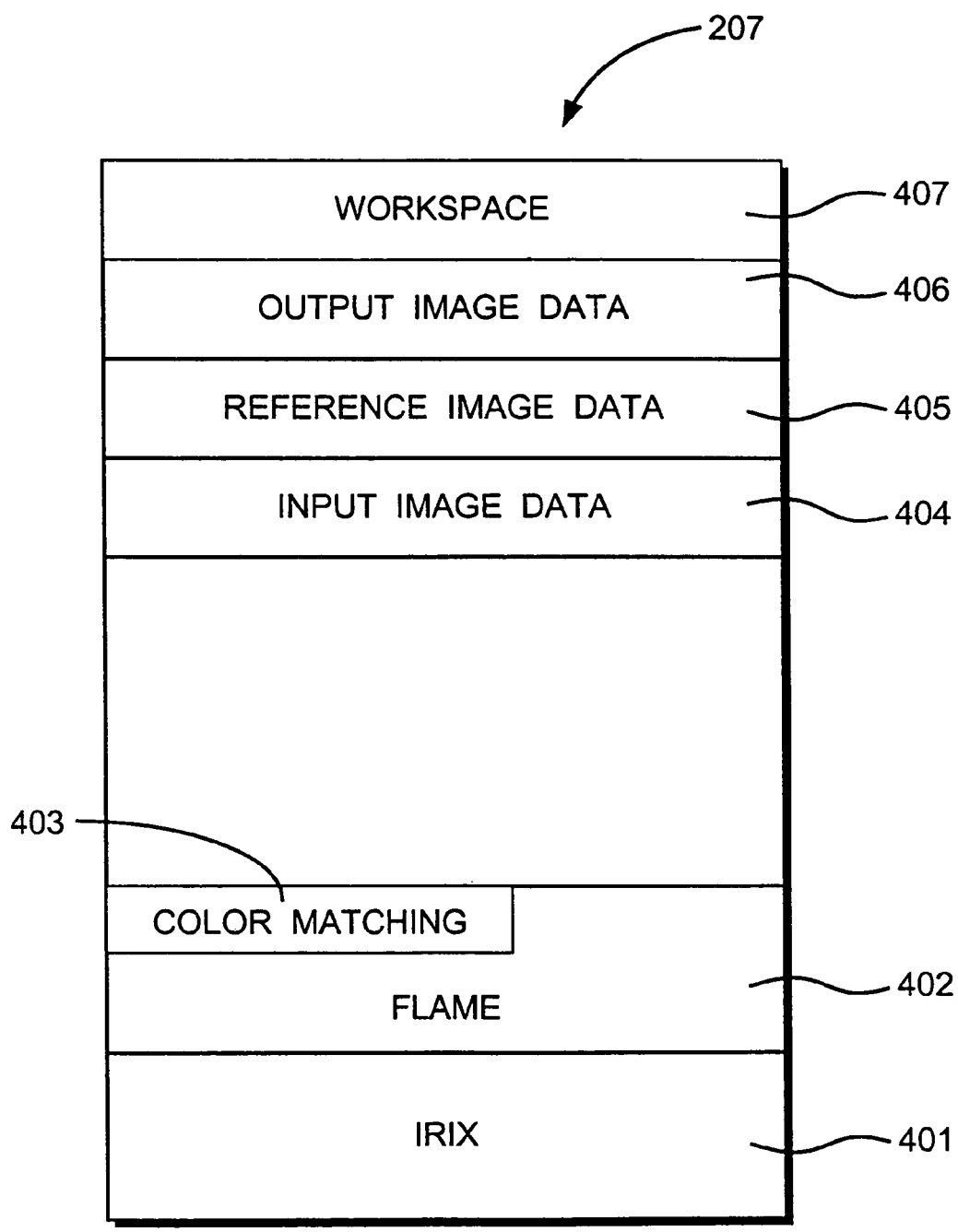
FIG. 4 details the contents of the main memory shown in FIG. 2 during execution of the image processing step shown in FIG. 3, including color matching instructions.

The contents of the main memory 207 shown in FIG. 2 during image processing 304 are detailed in FIG. 4. An operating system provides common instructions required for applications running on the computer 103. A suitable operating system is the Irix (TM) operating system available from Silicon Graphics. The present applicant has image processing applications that include Inferno (TM) and Flame (TM). The name Flame will henceforward refer to an improved version of Flame, operating in accordance with the present invention.

In the present embodiment, the main application consists of instructions 402 for Flame. These instructions 402 include color matching instructions 403, along with other instructions for processing image data. Main areas of memory used by the color matching instructions include input image data 404, reference image data 405 and output image data 406. Additionally, the main memory includes workspace 407, which may provide dynamically allocatable regions of memory as required by the execution of instructions 401, 402 and 403.

Figure 5:
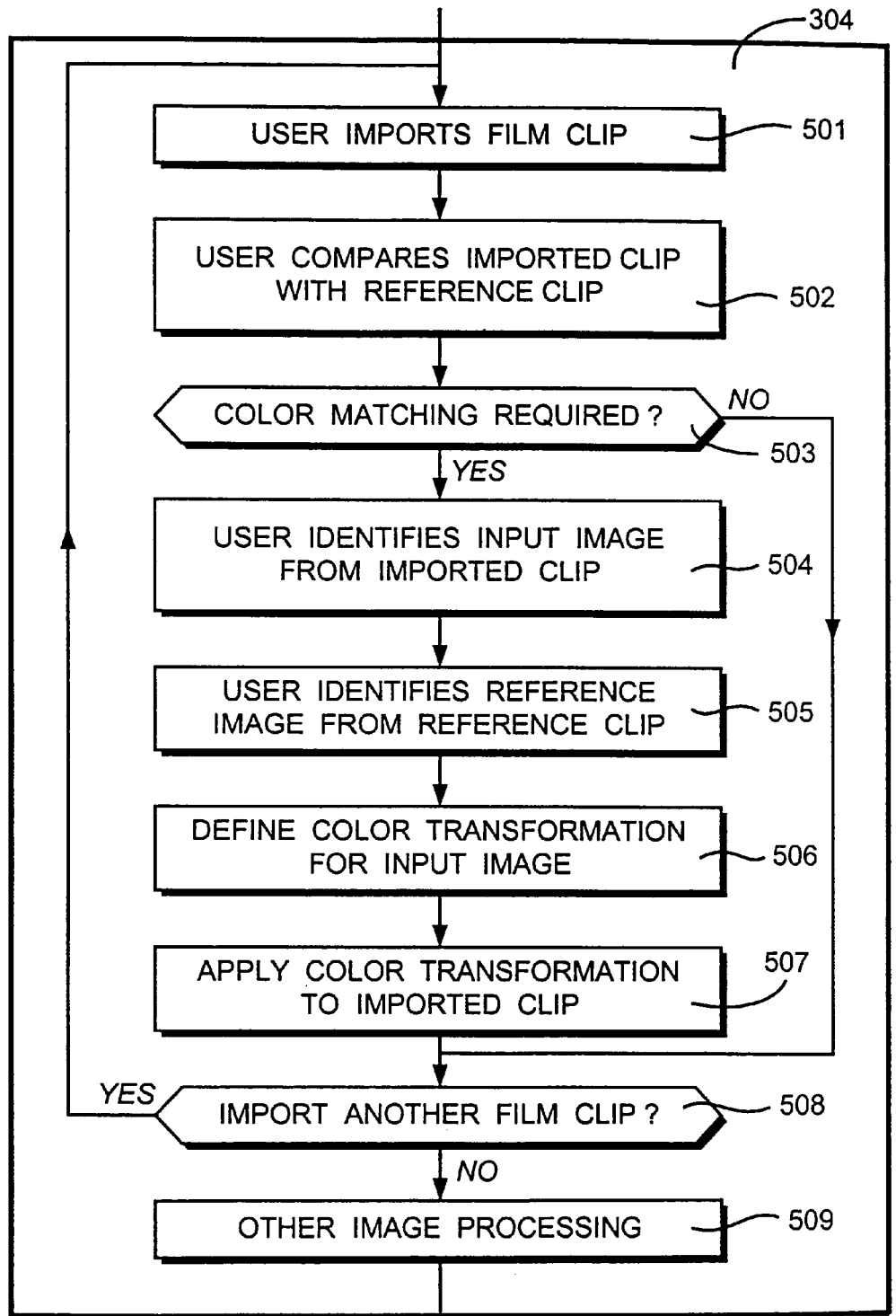
FIG. 5 details the image processing step shown in FIG. 3, including a step of defining a color transformation for an input image.

Steps performed during image processing 304 are illustrated in FIG. 5. At step 501 the user instructs the image processing system to import images from a film clip stored on a digital tape in the tape player 101. The clip comprises a plurality of images, with film images typically being stored as a sequence of twenty four frames of image data for each second of playback time. The clip images are transferred, with formatting if necessary, into the frame store 102. Once in the frame store 102, the image data can be manipulated at high speed, including preview and playback in real time. At step 502 the user compares the clip imported at step 501 with a reference clip. The reference clip is a clip comprising image data with a desired set of color characteristics.

Typically, a reference clip consists of a clip taken from a single camera, in a single take. Thus, all the characteristics of film chemistry and lighting are substantially consistent from frame to frame, across the entire duration of the reference clip. When editing together several clips for a single image sequence, differences in image color characteristics, as well as brightness and contrast, will be noticeable. This is particularly true if the component clips come from completely different sources, for example, when the same scene has been shot several times over a period of several days or weeks, or when combining together clips for a single scene that have been shot in different studios. It is also possible that some of the clips are sourced from video cameras.

In order to ensure that the single resulting clip does not have abrupt changes in aesthetics, it is the job of a film colorist to control a color matching process, perhaps by modifying the exposure times of film negatives during subsequent development and chemical processing. With the advent of digital processing, it has theoretically become possible to modify image color characteristics in an arbitrary manner. However, this requires the highly skilled intervention of a film colorist, who is able to determine what color modifications are required.

Thus, at step 502, the user compares color characteristics of a reference clip with the imported clip. At step 503 a question is asked as to whether color matching is required. If not, control is directed to step 508. Alternatively, control is directed to step 504. At step 504 it is known that the clip imported at step 501 requires color matching with the reference clip. In order to perform the color matching procedure, the user first identifies a single input image from the imported clip. This input image is a single frame of image data, and is stored at 404 in main memory 207. At step 505, the user identifies a single reference image from the reference clip, stored at 405 in main memory. The user identifies the input 404 and the reference image 405, intending that the identified input image is to be matched with the reference image, and thereafter, if the images 404 and 405 have been appropriately identified by the user, it may be possible to apply the same color matching transformation to all images in an input clip.

At step 506, the color transformation required for matching the input image 404 to the reference image 405 is defined. At step 507 the color transformation defined at step 506 is applied to the remaining images in the imported clip. At step 508 a question is asked as to whether it is required to import another film clip. If so, control is directed to step 501. Alternatively, if all input clips have been imported, operations may then proceed to step 509, where the input clips are processed and combined in various ways, in accordance with the known arts of digital image compositing and processing.

Figure 6:
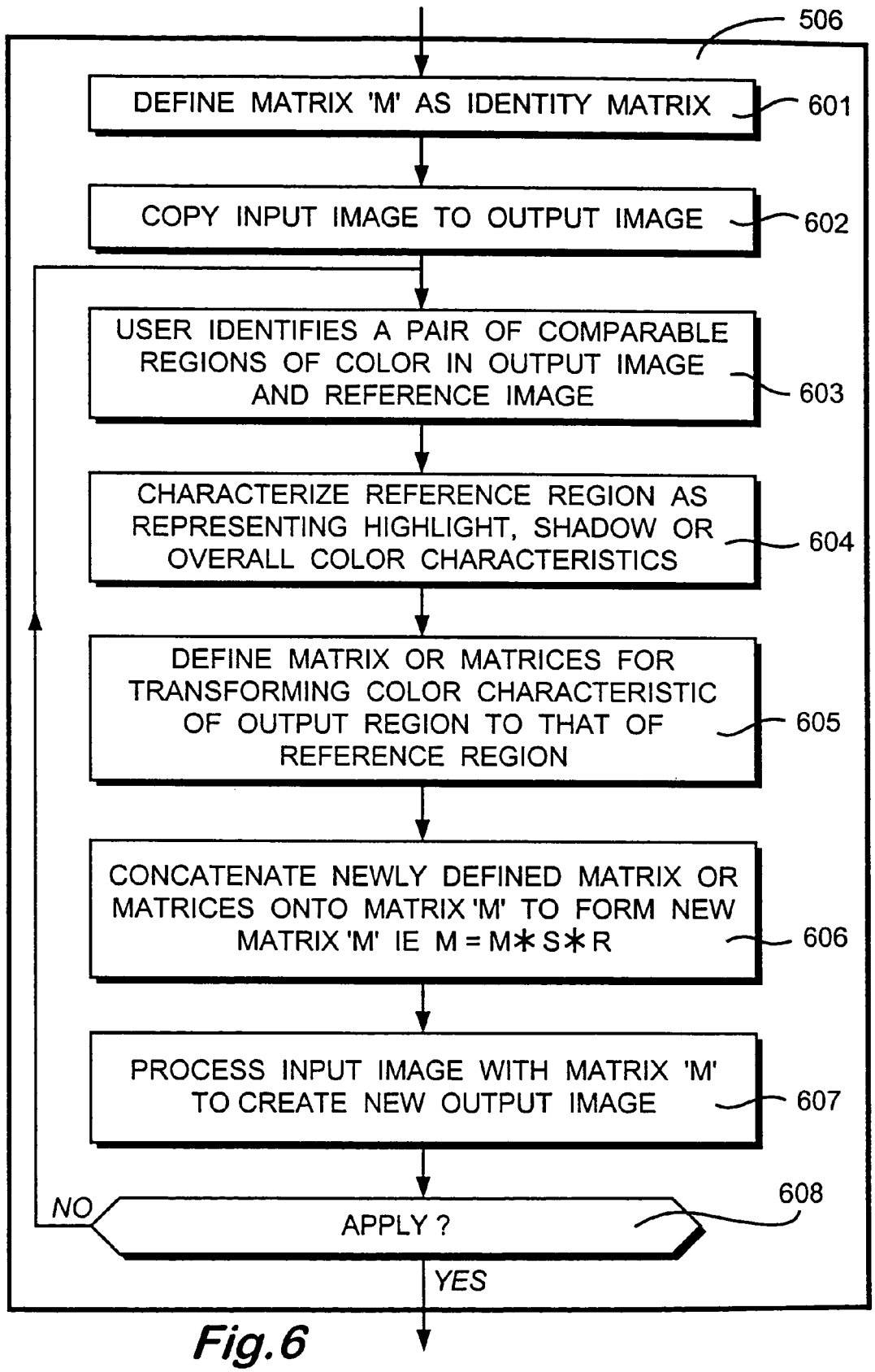
FIG. 6 details the step of defining a color transformation, in accordance with the invention, as performed by operations resulting from the color matching instructions shown in FIG. 4, including a step of characterising a region and a step of defining a transformation.

The step of defining a color transformation 506 shown in FIG. 5 is detailed in FIG. 6. The steps of FIG. 6 summarise the invention.

At step 601 a matrix M is created and initialised as an identity matrix. Input image data 404 comprises pixels, each of which have a red, green and blue (RGB) color value. Matrix M will eventually be used to modify RGB values so as to perform color matching. However, at step 601 matrix M is initialised such that, when applied to an image RGB pixel, the resulting RGB values are unchanged. At step 602 the input image 404 is copied to an output image 406. Throughout color matching, the input image 404 will remain unchanged, and an output image 406 will be generated in response to matrix M at each iteration of the procedure, in order to monitor and facilitate further refinement of the color matching transformation.

At step 603 the user identifies a pair of comparable regions in the output image 406 and reference 405 image. In order to perform color matching successfully, it is necessary to perform adjustments to color characteristics across a range of luminance values. Thus, in selecting a pair of regions at step 603, the user identifies regions having one of three possible characteristics: highlight, shadow or overall.

Initially, the user may identify highlight regions. Thus, a region in the output image having a high brightness is identified. Then, a region in the reference image is also identified, which contains the correct color and or luminance characteristics for the region selected in the output image. The type of identified region is characterised at step 604.

The pair of regions identified at step 603 defines a difference in color and or luminance characteristics. At step 605, differences between the identified regions are analysed in order to define a difference matrix or matrices. These matrices are characterised in that, if applied to the image data of the input image 404, the identified region in the output image has its color and or luminance characteristics matched to those of the identified reference region. Other parts of the output image would also be affected, to varying degrees. The hope is that these results will also be appropriate, and have the effect of bringing the overall color and or luminance characteristics of the whole output image 406 closer to that of the reference image 405. The type of processing performed at step 605 is dependent upon the region characteristic identified at step 604.

It is intended to modify the matrix many times by repeating steps 603, 604 and 605. The resulting difference matrix would only represent the latest incremental difference, and not the color difference between the input image 404 and the reference image 405. It is desirable to define this full difference transformation, so that it may then be subsequently applied to several frames of image data from the originally imported film clip. Furthermore, an improvement in processing quality may result in certain implementations where image pixel RGB values are restricted in precision, if only a single transformation is applied to the input image 404.

In order to define the full transformation, at step 606 the difference matrix or matrices defined at step 605 are concatenated onto matrix M. In matrix arithmetic, this is written as M=MSR, where S and R are differential transformations defined as a result of the analysis performed at step 605. The resulting matrix M is applied to the input image 404, to create new data for the output image 406. At step 608, a question is asked as to whether the result has achieved a close enough color match between the output and reference images, so that this transformation may now be applied. If so, this concludes the steps for defining a color matching transformation 506.

On a subsequent iteration, at step 603 the user identifies a region in the output image that is dark. The user selects a corresponding dark region in the reference image 404 towards which the characteristics of the output region should be transformed. The reference region is characterised as a shadow region at step 604. At step 605 difference matrices are defined, and these are concatenated onto matrix M. Again, the output image 406 is updated at step 607.

In another iteration, the user identifies a pair of regions having overall characteristics. In other words, a region that includes a range of luminance values characteristic of the whole image, or important parts of it. The processing performed with respect to an overall region is different at step 605, where only a single difference transformation matrix is defined. This is concatenated onto matrix M at step 607.

Having defined highlight, shadow and overall region transformations, resulting in a matrix M that encompasses these, it is possible for the user to continue selecting and matching highlight, shadow or overall regions, in any order, until the output image is sufficiently matched in appearance with the reference image 405. Eventually, at step 608, the user will decide to apply the resulting matrix M to a frame or frames of input image data in the imported clip.

The steps shown in FIG. 6 enable the user to construct a highly complex color and luminance transformation by repeated iterations of an extremely simple procedure.

Figure 7:
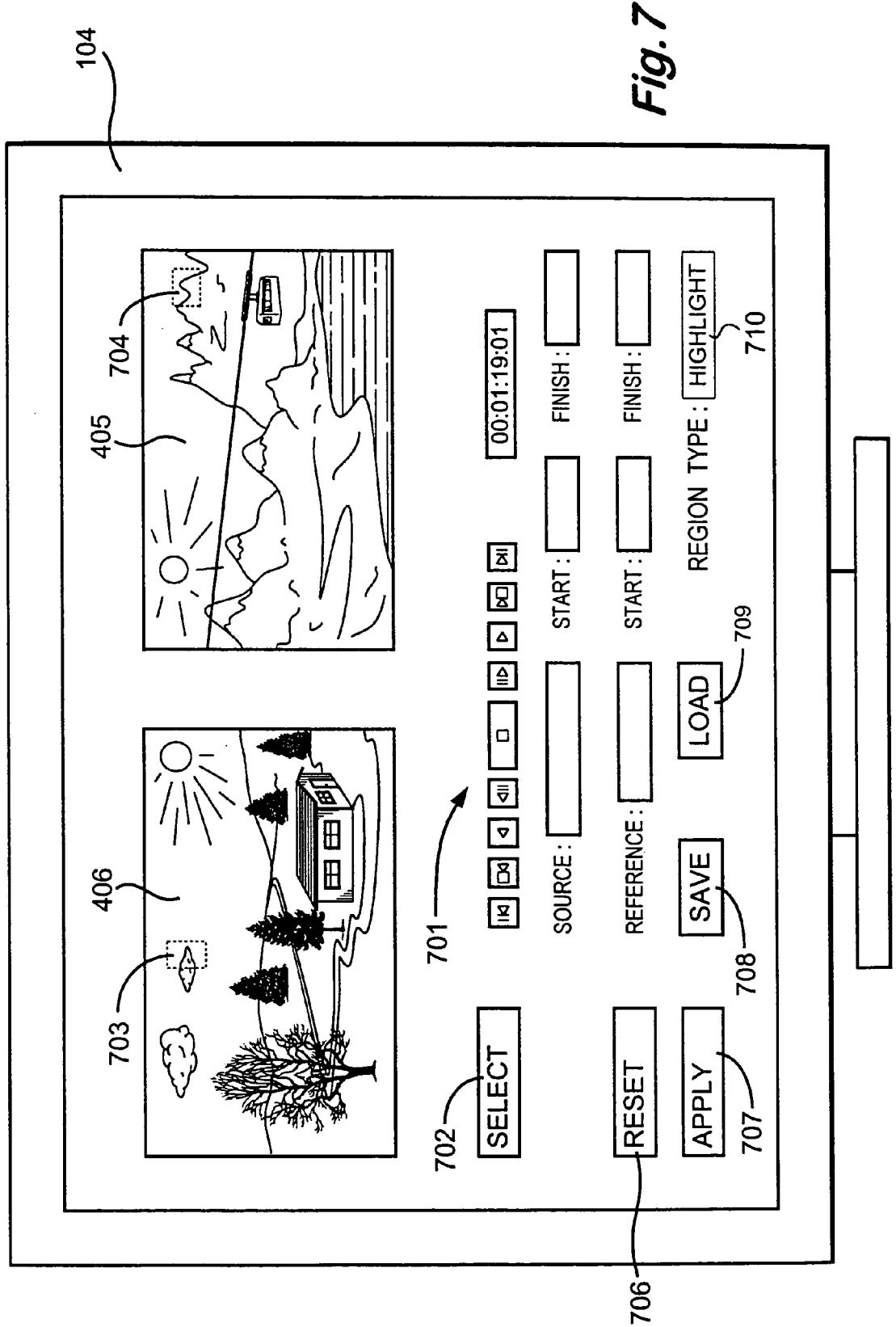
FIG. 7 details an interface presented to the user of the image processing system on the monitor shown in FIG. 1, while the color matching instructions shown in FIG. 4 are being executed.

The user interface presented to the user, for implementing the steps of FIG. 6, is shown in FIG. 7. The monitor 104 includes regions for displaying the output image 406 and the reference image 405. In addition, there are transport controls 701 for the selection of suitable frames from imported and reference clips, and also for previewing the results of applying a color transformation to multiple frames. Soft buttons are provided for several functions, and these are activated by user interactions with the graphics tablet 105 or the keyboard 106.

A select button 702 instructs the image processing system to permit the user to identify regions in the output 406 and reference images 405 on the display. The user drags the cursor over an area of each image in order to identify a rectangular region of pixels that will be used for subsequent analysis. An output region 703 and a reference region 704 are shown in the example in FIG. 7. The user selects the output region 703 first, and the reference region second. As soon as the user ends the dragging operation to define the second region 704, processing takes place, as defined at steps 605, 606 and 607 in FIG. 6. The user may define a different reference region 704 without defining a new output region 703. Each time the user completes the drag operation to select the reference region, processing is activated automatically. This enables the user to obtain a useful and accurate result very quickly.

A reset button 706 enables the user to cancel all concatenated transformations, and to restart the steps shown in FIG. 6. An apply button 707 enables the user to apply the transformation, that has been constructed over several iterations, to multiple image data. Save and load buttons 708 and 709 enable the user to save the transformation for subsequent use in a different session. An indication of the type of region identified at step 604 is shown at 710, so that the user is aware of the type of matching that will occur when processing commences after a new reference region 704 is defined.

Figure 8:
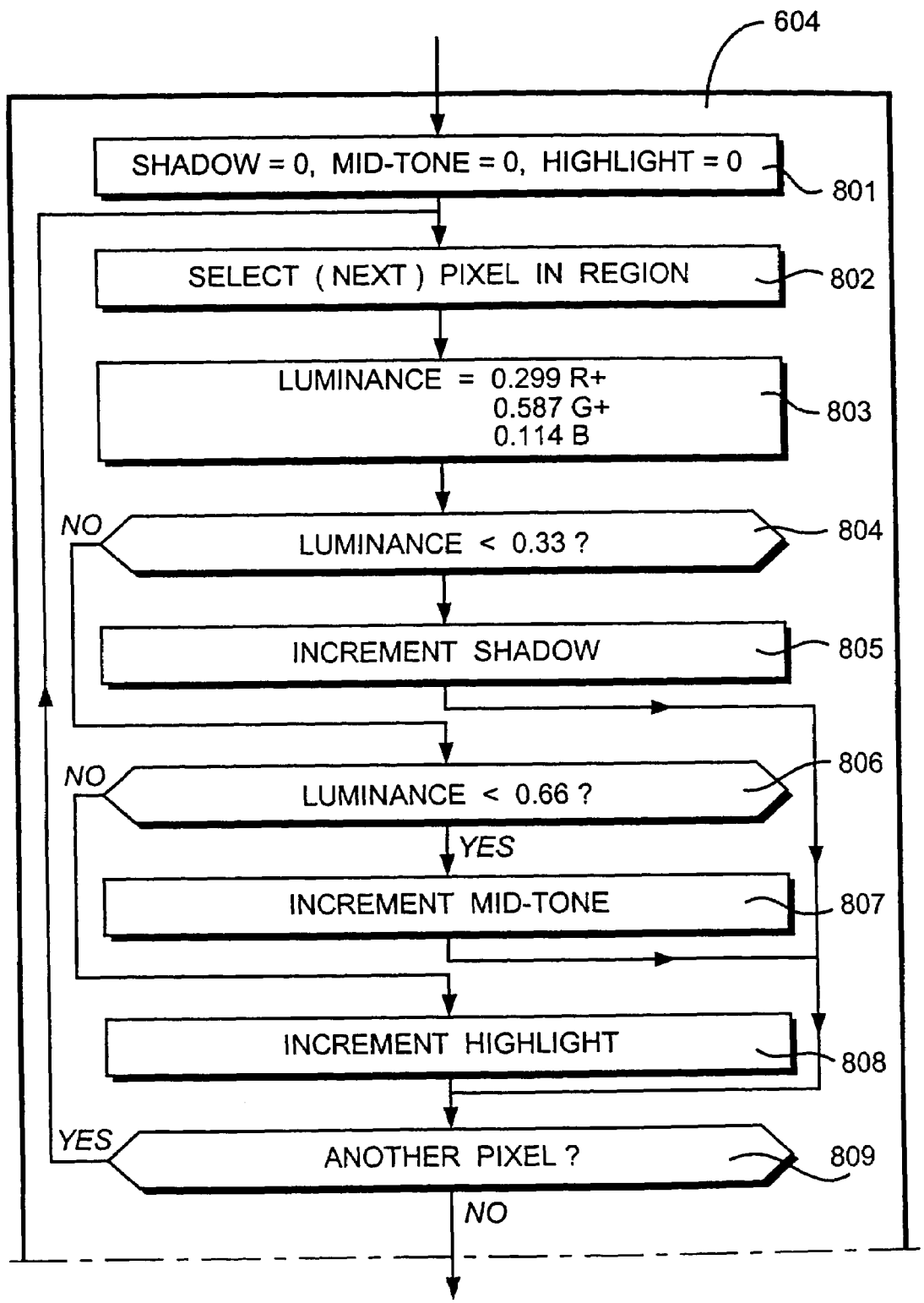
FIGS. 8 and 9 detail the step of characterising a region shown in FIG. 6.
Figure 9:
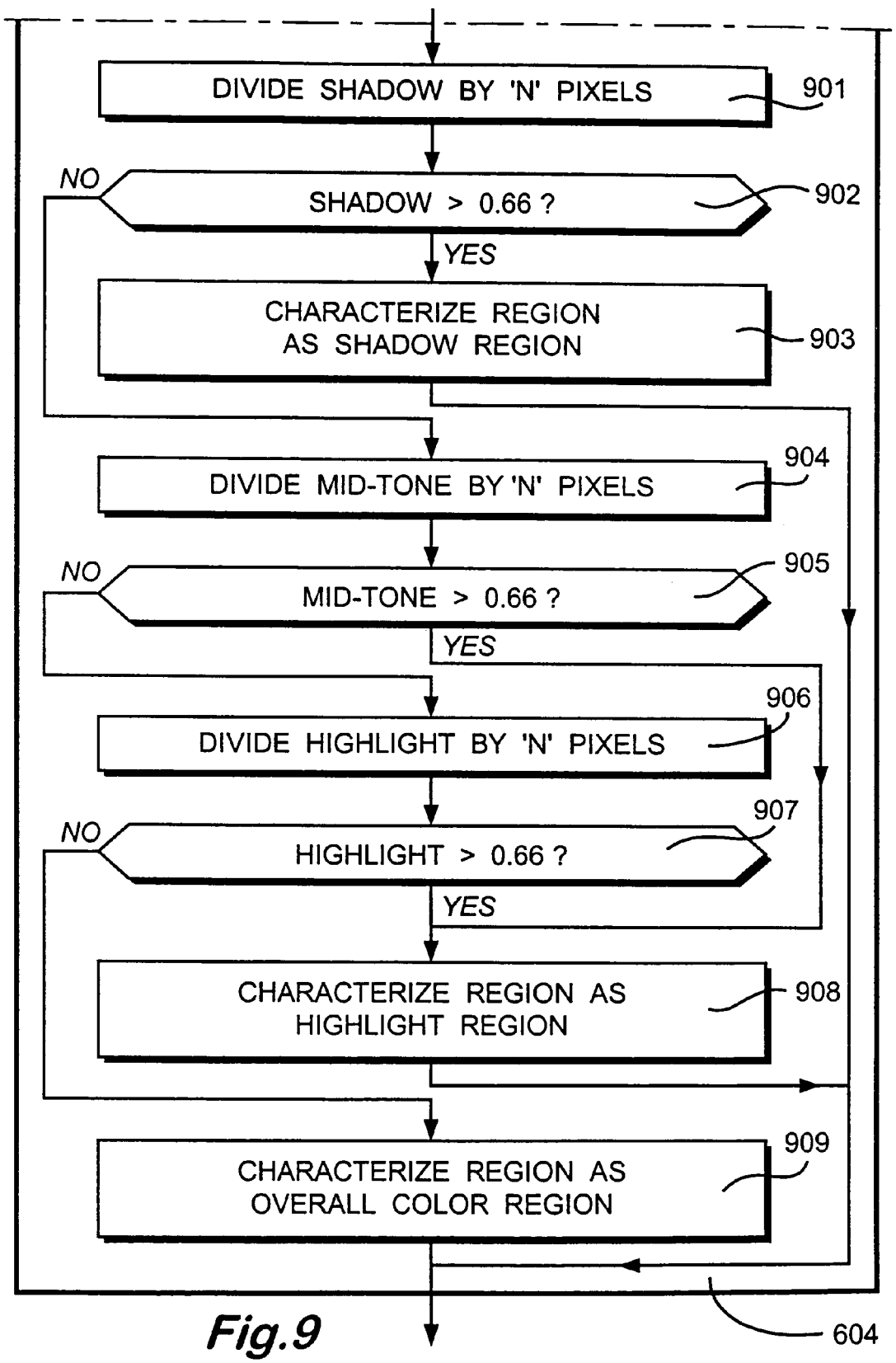

Details of the characterising process performed at step 604 in FIG. 6 are detailed in FIGS. 8 and 9. At step 801 three counters are initialised to zero. These counters are SHADOW, MID-TONE and HIGHLIGHT. At step 802 the first or next pixel in the reference region is selected. At step 803 a luminance value is calculated in accordance with the expression shown. At step 804 a question is asked as to whether the luminance calculated at step 803 is less than 0.33. If so, SHADOW is incremented at step 805. Alternatively, at question 806 a question is asked as to whether the luminance is less than 0.66. If so, MID-TONE is incremented at step 807. Alternatively, HIGHLIGHT is incremented at step 808. After incrementing one of the three counters depending upon the luminance of the selected pixel, control is directed to step 809. At step 809 a question is asked as to whether there are any remaining pixels in the rectangular identified region 704 in the reference image 405. If so, control is directed to step 802, and the pixel characterisation steps are repeated.

Alternatively, if all identified pixels have been characterised, control is directed to step 901 in FIG. 9. At step 901 SHADOW is divided by NPIXELS, the number of pixels in the identified region 704. At step 902 a question is asked as to whether SHADOW is greater than 0.66. If so, the region 704 is characterised as a shadow region at step 903. Alternatively, at step 904 MID-TONE is divided by NPIXELS, and at step 905 a question is asked as to whether MID-TONE is greater than 0.66. If so, the region 704 is characterised as a highlight region at step 908. Alternatively, at step 909, if the region is neither a shadow nor a highlight region, the region is characterised as an overall color region. This concludes the steps performed within step 604, in which the identified reference region is characterised. Characterisation of the output region 703 is not performed, as this is a region that is intended for transformation, and hence not reliable as a source of characterisation data.

Figure 10:
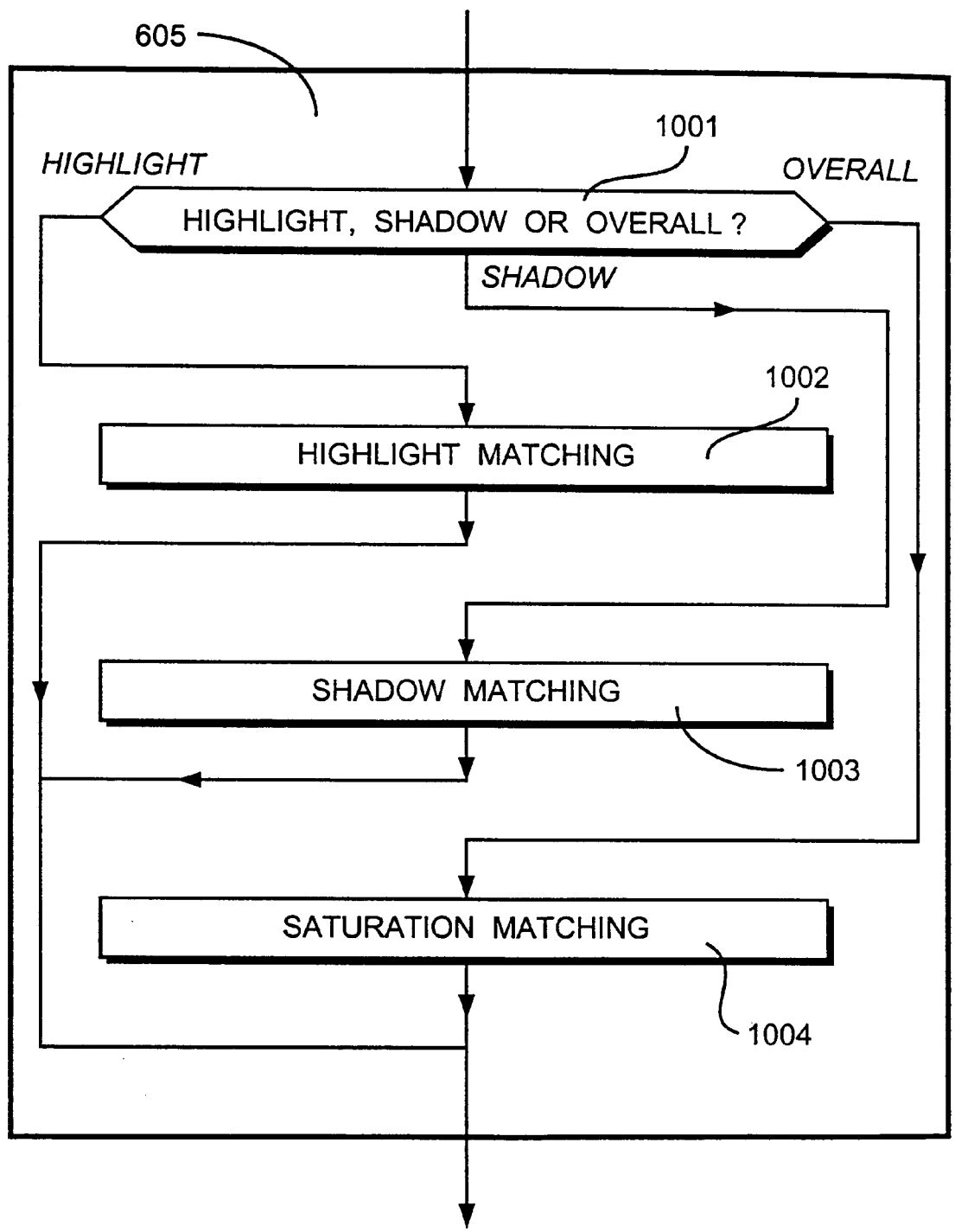
FIG. 10 summarises procedures performed during the step of defining a transformation shown in FIG. 6, including a step of highlight matching, a step of shadow matching and a step of saturation matching.

Once characterisation has been performed at step 604 in FIG. 6, processing may then proceed with the selection of an appropriate color matching method. A summary of processing at step 605 is shown in FIG. 10. At step 1001 a question is asked as to whether highlight, shadow or overall processing is to be performed. Step 1002, 1003 or 1004 is then selected accordingly.

In the invention it is considered useful to define modifications to pixel data, in such a way that it is possible to transform a pixel's luminance without varying its color, or, as an alternative, to transform a pixel's color without transforming its luminance. By characterising differences between identified regions 703 and 704 in separate terms of luminance and color, it becomes possible to perform general shifts in luminance and then color that are appropriate to a range of color values in an image.

Figure 11:
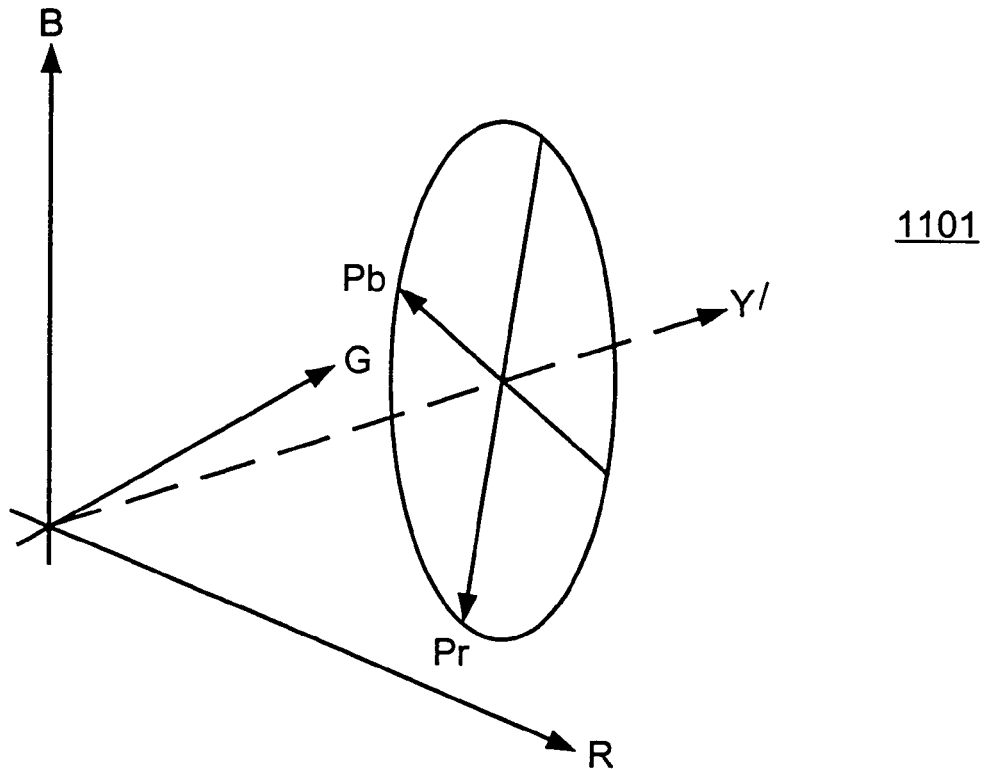

FIG. 11 details color spaces that are used in the preferred embodiment. The first color space is the red, green and blue (RGB) color space. Pixel data for images 404, 405 and 406 is stored in this format, with each pixel being defined by an intensity value for red, green and blue components. The second color space is the Y'PbPr color space. Y' is a dimension of pure luminance, varying from zero to one. Pb and Pr are color dimensions, with Pb being closely related to the blue of RGB, and Pr being closely related to green. Pb and Pr range across negative and positive values, and these may be considered as varying from minus one to plus one. However, these values are arbitrary and depend upon implementation.

Y'PbPr color space may be considered as having a cylindrical shape with a central axis Y', that is a vector extending out from the origin of RGB color space, as shown at 1101. Conversion between these color spaces may be achieved by a matrix, and the parameters required for a transformation from RGB to Y'PbPr are detailed at 1102. Transformation from RGB to Y'PbPr may be assigned to a matrix A. The inverse of A, $A^{-1}$, provides transformation from Y'PbPr to RGB. There is an intuitive relationship between these color spaces for colors of pure black and pure white, as shown at the bottom of FIG. 11.

Y'PbPr color space may be viewed as shown in FIG. 12. The projection shown at 1201 ignores the luminance dimension, and permits characterisation of pure color. Shades of grey from black to white are located at the origin 1202. The amount of color can be quantified by a saturation value, which can be viewed geometrically as the length of the vector from the centre 1202 to a color's PbPr co-ordinates. All three dimensions of Y'PbPr color space may be viewed as shown at 1204.

Figure 13:
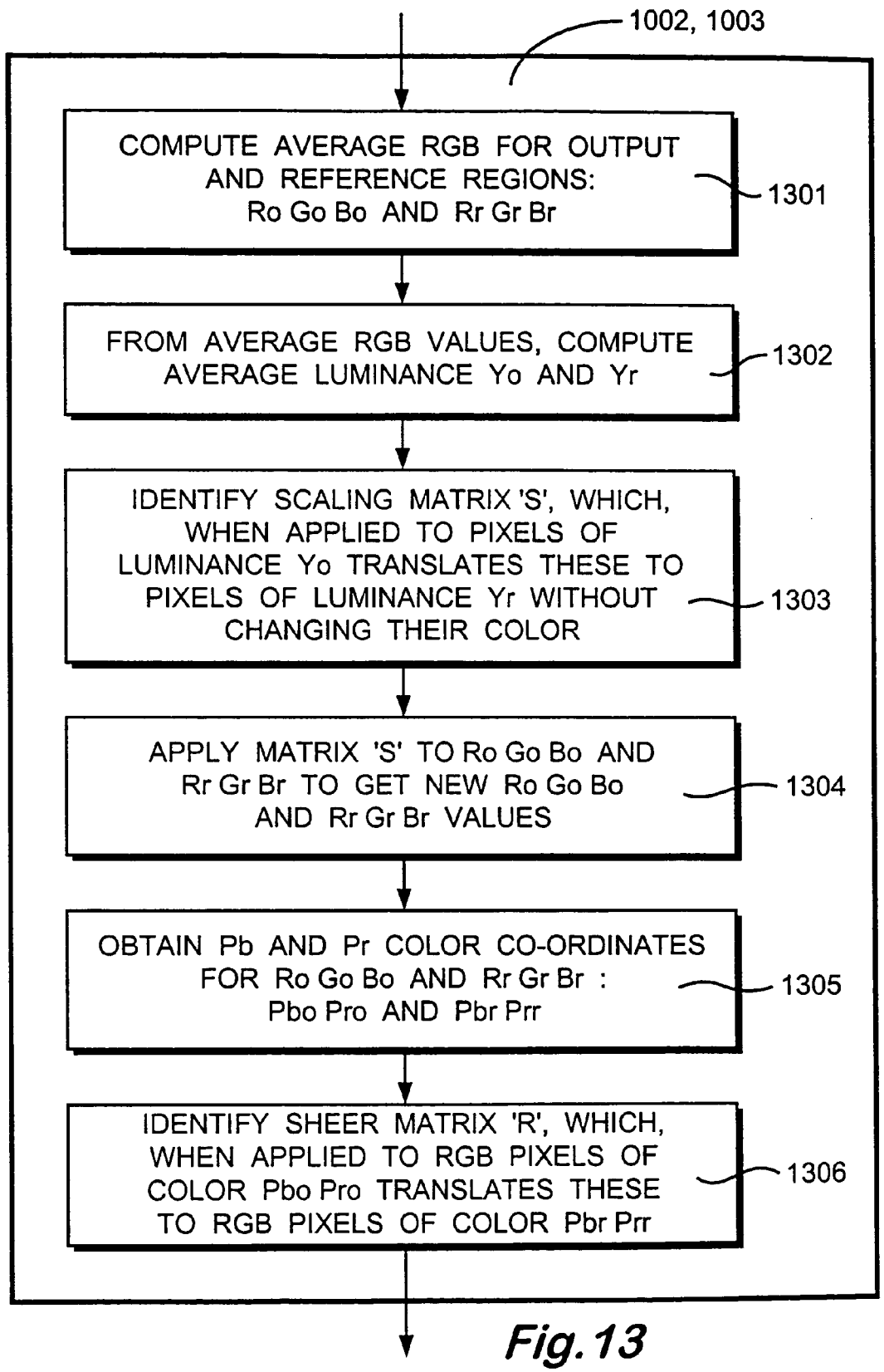
FIG. 13 summarises operations performed at either the step of highlight matching or the step of shadow matching shown in FIG. 10.

Details of highlight processing 1002 are shown in FIG. 13. FIG. 13 also applies to shadow processing 1003; these two processes will be distinguished diagrammatically in FIGS. 14 and 15. At step 1301 average RGB values are computed for both the output 703 and reference 704 regions. For the output region Ro, Go and Bo represent the average reds green and blue values. For the reference region, Rr, Gr and Br represent the average pixel values. At step 1302 the average luminance is calculated for the output and reference regions. Yo is the average luminance of the output region 703, Yr is the average luminance of the reference region 704. Average luminance is determined by processing the RGB averages calculated at step 1301 in accordance with the equation for luminance Y' given at 1102 in FIG. 11.

At step 1303 a scaling matrix S is identified that, when applied to RGB pixels having luminance Yo, translates their RGB values such that their luminance becomes Yr. By considering luminance in isolation, color values are not changed by this matrix. RGB values having a luminance other than Yo have their luminance translated proportionately, again without affecting color. Thus, steps 1302 and 1303 result in a scaling matrix S that modifies the luminance of pixels in order to match the luminance of output region 703 to that of reference region 704, without changing the color of any pixel.

At step 1304 matrix S is applied to RoGoBo and RrGrBr, prior to color processing in response to their modified values.

At step 1305, Pb and Pr color co-ordinates are obtained from the updated color values created at step 1304. This is done using the Pb and Pr equations shown at 1102 in FIG. 11. For the output region 703, values Pbo and Pro are created. For the reference region 704, values Pbr and Prr are created.

At step 1306 a sheer matrix R is identified which, when applied to RGB pixels having color (Pbo,Pro) translates their RGB values such that their color becomes (Pbr,Prr). By considering color in isolation from luminance, a pure color shift is achieved. Pixels at different color values from (Pbo,Pro) have their color modified proportionately, again without changing luminance.

Steps 1304, 1305 and 1306 result in a sheer matrix R that modifies RGB pixel values in order to match the color of output region 703 to that of reference region 704.

Figure 14:
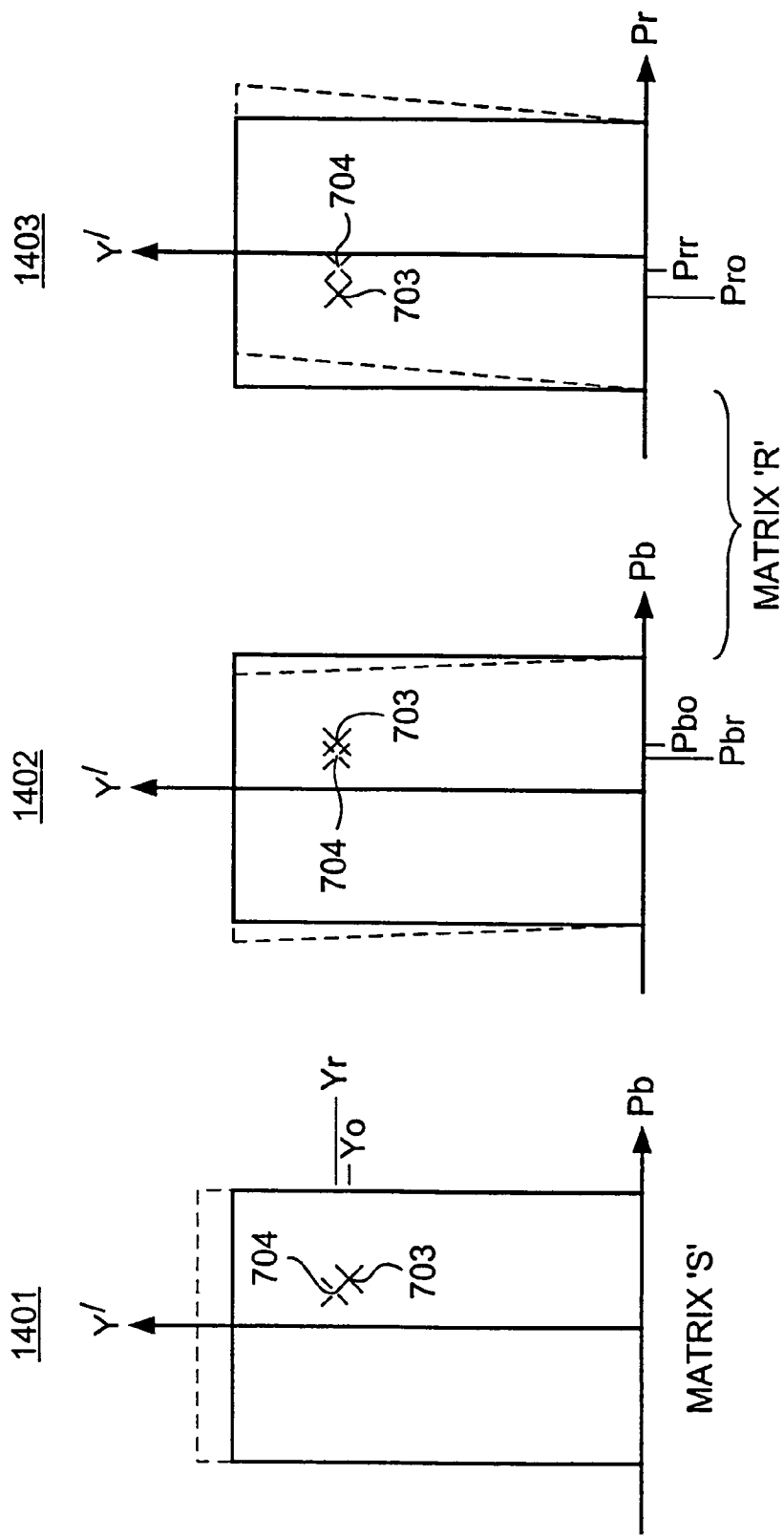
FIG. 14 illustrates the effect of the step of highlight matching shown in FIG. 10.

A graphical illustration of highlight processing, performed in accordance with the steps of FIG. 13, is detailed in FIG. 14. At 1401 the scaling requirement satisfied by matrix S is illustrated. The average luminance of output region 703 is represented by a cross. The vertical displacement of this cross must be adjusted to match that of the cross representing the reference region 704. This is achieved by a scaling of Y'PbPr color space in the Y' dimension. Dimensions of color are unaffected by this scaling. Thus, value Yo of output region 703 is scaled to value Yr. From the illustration it may be seen that all other luminance values are affected proportionately, and the application of matrix S to any output pixel will result in a scaling of its luminance appropriate for matching with the reference image 405.

The sheer requirement for defining matrix R is illustrated at 1402 and 1403, for Pb and Pr dimensions respectively. In highlight processing 1002, the black end of Y'PbPr color space is fixed, and the sheer is applied to the white end, in such a way that Pbo is moved to Pbr, and Pro is moved to Prr. Other points in color space are modified proportionately.

Figure 15:
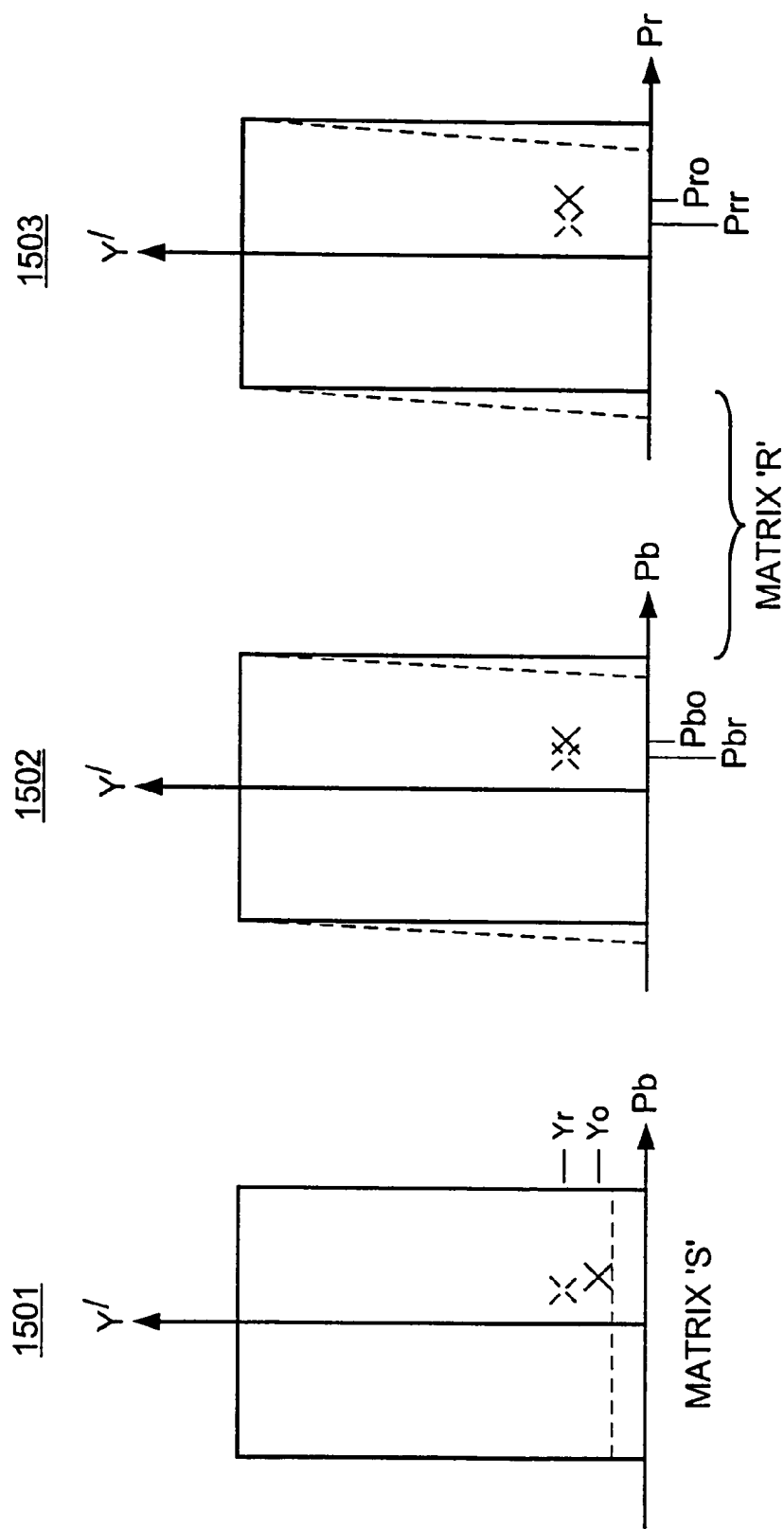
FIG. 15 illustrates the effect of the step of shadow matching shown in FIG. 10.

Shadow processing 1003 is illustrated in FIG. 15. In shadow processing, all transformations are performed with the white end of Y'PbPr color space fixed, and movements occurring at the black end. Thus, at 1501, the scaling matrix S that is defined results in point of luminance Yo being moved to the same color at luminance Yr. However, unlike highlight processing, this scaling is performed with the white end fixed. As will be understood by those knowledgeable in the art of geometric matrix manipulations, this is achieved by a concatenation of three operations: a translation, a scaling, and a re-translation to undo the effect of the translation. Matrix S is a concatenation of these three operations.

The sheer operation performed in shadow processing 1003 is illustrated at 1502 and 1503, with respect to Pb and Pr dimensions of Y'PbPr color space. As with highlight processing, a sheer is applied to an end of Y'PbPr color space such that Pbo moves to Pbr, and Pro moves to Prr. However, the sheer matrix R encompasses operations such that the sheer is applied to the dark end of Y'PbPr color space, while the light end remains fixed.

Matrices S and R are defined using known three-dimensional mathematical techniques and equations for matrices. In particular, in order to define a geometric manipulation in Y'PbPr color space, for application to pixels having RGB values, it is necessary to translate the pixel RGB value to Y'PbPr, apply a matrix s operating in Y'PbPr color space, and then convert back to RGB, by performing the operation:

$$S = A \, s \, A^{-1}$$

in which $A^{-1}$ is the inverse of matrix A, which translates from RGB to Y'PbPr color space, as indicated in FIG. 11. The same type of operation may be achieved for the sheer matrix R:

$$R = A \, r \, A^{-1}$$

thereby simplifying the concatenation of matrix M, that can operate directly on pixels in RGB color space:

$$M = MSR$$

However, the geometric transformations encoded within matrix M ensure that luminance and color translations and sheers are applied independently and appropriately.

Figure 16:
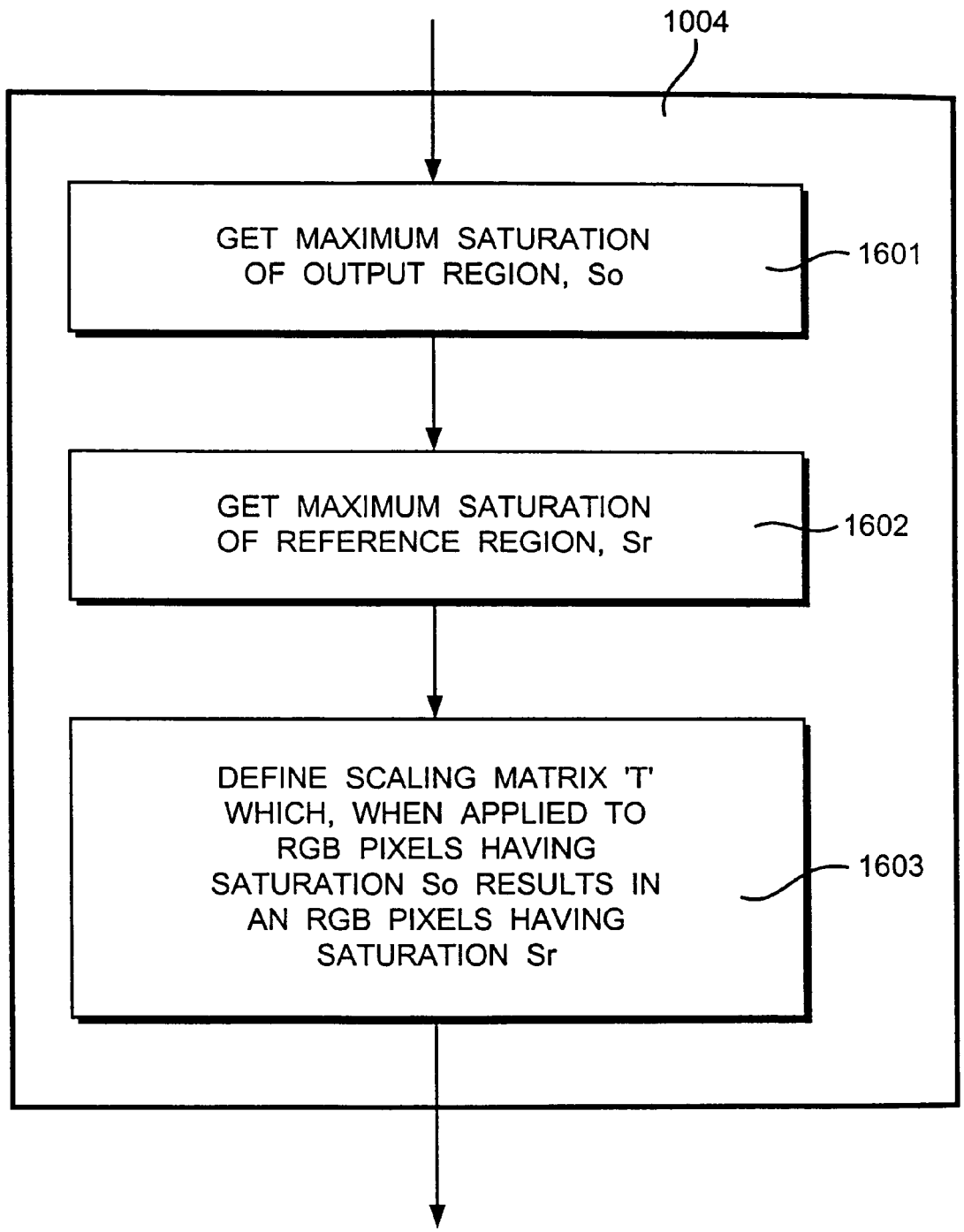
FIG. 16 summarises the step of saturation matching shown in FIG. 10, including steps where a maximum saturation is calculated.

The third type of region that may be selected by the user at step 603 is an overall region. Pixels in this type of region have a wide range of luminance values, and in the corresponding matching process, luminance is ignored. The overall color spread is compared and matched. Overall color processing 1004 is summarised in FIG. 16. At step 1601 the maximum saturation, So, of the output region 703 is calculated. At step 1602 the maximum saturation, Sr, of the reference region 704 is calculated. At step 1603 a scaling matrix T is defined that, when applied to RGB pixels having saturation So, results in RGB values having saturation Sr.

Figure 17:
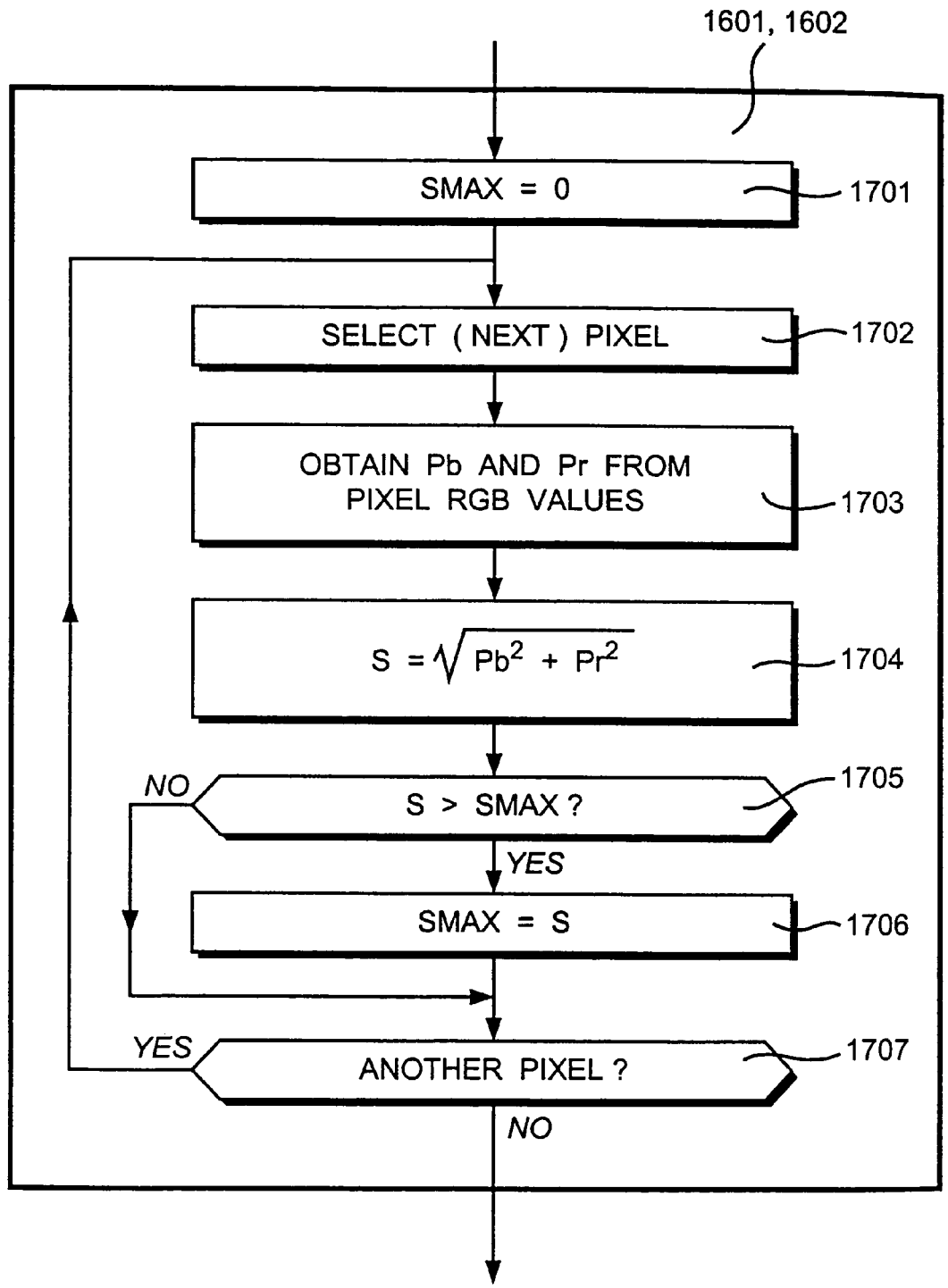
FIG. 17 details a method for calculating a maximum saturation, as required by steps in FIG. 16.

Processing for the identification of maximum saturation values, required at steps 1601 and 1602, is detailed in FIG. 17. At step 1701 a variable SMAX is initialised to zero. At step 1702 the first or next pixel is selected. At step 1703 values for Pb and Pr are obtained from the RGB values, according to the equations given at 1102 in FIG. 11.

At step 1704 the magnitude of the saturation vector is calculated as being equal to the square root of the sum of the squares of Pb and Pr for the selected pixel. At step 1705 a question is asked as to whether the value calculated at step 1704 is greater than SMAX. If so, SMAX is updated with this value at step 1706. Alternatively, control is directed to step 1707. At step 1707 a question is asked as to whether there are any other pixels in region 703 or 704 that require processing. If so, control is directed to step 1702. Alternatively, this completes the calculations for the region, with the maximum color saturation given by the current value of variable SMAX.

Figure 18:
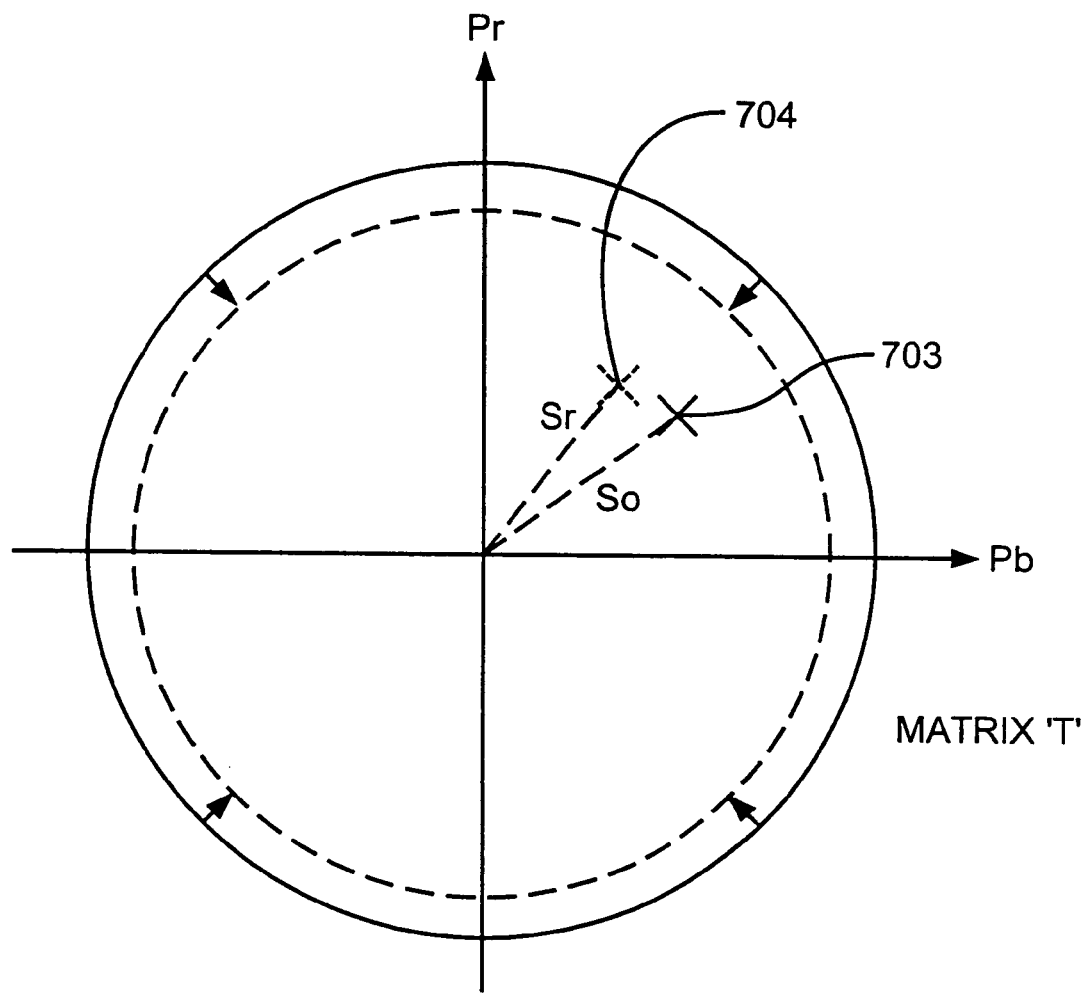
FIG. 18 illustrates the effect of the saturation matching steps shown in FIG. 16.

An illustration of the overall matching process is shown in FIG. 18. Point 703 represents the pixel in output region 703 that has the greatest saturation. Point 704 represents the pixel in reference region 704 that has the greatest saturation. A matrix T is defined such that the saturation So is made equal to saturation Sr. However, only the magnitude of the vector So changes, not its direction. The direction of the vector may change subsequently, as a result of sheer operations being applied to one or the other end of Y'PbPr color space, in accordance with highlight and or shadow processing. Again, a matrix t in Y'PbPr color space may be defined, and converted for use on RGB data by the relation:

$$T = A\, t\, A^{-1}$$

and matrix M is updated t step 606 in accordance with:

$$M = MT$$

Thereafter RGB pixels may be processed by application of matrix M, and only a single matrix vector product is required per pixel, even though the transformations defined and concatenated into matrix M over several iterations may be complex. Once a satisfactory color match has been achieved between the output image 406 and the reference image 405, matrix M may finally be applied to multiple images in a film clip, or alternatively just the single frame of input image data 404, as required. The invention is applicable to image data of any source or format, where color matching between images is required.

It is possible for the color characteristic of the input clip or the reference clip to change gradually over a sequence of frames. Matrix M may be animated to take into account these variations. For example, a first matrix M1 is defined for frame one of a clip, and a second matrix M10 is defined for frame ten of a clip. Interpolation is performed between these two matrices for the intermediate frames two to nine, resulting in the matrices M2 to M9 being applied to these intermediate frames. This may be considered a case of animating the matrix M in response to color changes occurring in the film or other source material.

An animation curve may be defined by the user for controlling interpolation between the matrices of different frames. In the above example, the animation curve would modify the rate of change from M1 to M10. This may take into account sudden variability, for example when clouds obscure sunlight at frame seven. The animation curve may be defined by user-defined control points along a spline, or other curve.

What we claim is:

1. Apparatus for processing image data, including memory means for storing image data and processing instructions, processing means for performing said image processing, said instructions defining operations to be performed by said processing means in order to process said image data, said processing means being configurable by said instructions such that:
    an input clip is to be color matched with a reference color characteristic;
    color matching transformations have been defined for at least two image frames in said input clip;
    said operations include steps of:
    interpolating between said color matching transformations in order to define intermediate transformations, and
    processing intermediate image frames between said two image frames with reference to said intermediate transformations.

2. Apparatus according to claim 1, wherein said processing means is further configurable by said instructions such that said interpolation is controlled by an animation curve.

3. A method of processing image data in an image processing system including memory means for storing image data and processing instructions, processing means for performing said image processing, said instructions defining operations to be performed by said processing means in order to process said image data, wherein
    an input clip is to be color matched with a reference color characteristic;
    color matching transformations have been defined for at least two image frames in said input clip;
    said operations include steps of:
    interpolating between said color marching transformations in order to define intermediate transformations, and
    processing intermediate image frames between said two image frames whir reference to said intermediate transformations.

4. A method according to claim 3, wherein said interpolation is controlled by an animation curve.

5. A computer-readable medium having computer-readable instructions executable by a computer configured as port of an image processing system, said computer including memory means for storing image data and processing instructions, processing means for performing said image processing, said instructions defining operations to be performed by said processing means in order to process said image data, said instructions define operations for preparing initial conditions of said image processing means wherein
    an input clip is to be color matched with a reference color characteristic;
    color matching transformations have been defined for at least two image frames in said input clip; and
    said instructions define subsequent operations of said processing means to include the steps of:
    interpolating between said color matching transformations in order to define intermediate transformations, and
    processing intermediate image frames between said two image frames with reference to said intermediate transformations.

6. A computer-readable medium according to claim 5, wherein said interpolation is controllable by an animation curve.

* * * * *